UNITED STATES PATENT OFFICE.

ANTOINE PIERRE GUILLAUME ROLLET, OF ST. ETIENNE, FRANCE; PHILIP MAURO, OF WASHINGTON, DISTRICT OF COLUMBIA, ADMINISTRATOR OF SAID ROLLET, DECEASED.

PROCESS OF REFINING METALS.

SPECIFICATION forming part of Letters Patent No. 491,498, dated February 7, 1893.

Application filed August 28, 1889. Renewed December 5, 1892. Serial No. 454,206. (No specimens.) Patented in France May 10, 1884, No. 162,003; in England October 28, 1884, No. 14,264, and in Germany May 20, 1885, No. 33,386.

*To all whom it may concern:*

Be it known that I, ANTOINE PIERRE GUILLAUME ROLLET, a citizen of France, residing at St. Etienne, (Loire,) France, have invented certain new and useful Improvements in Processes of Refining Metals, (for which I have received Letters Patent in France, No. 162,003, dated May 10, 1884; in England, No. 14,264, dated October 28, 1884, and in Germany, No. 33,386, dated May 20, 1885;) and I do hereby declare the following to be a full, clear, and exact description of the invention, such as will enable others skilled in the art to which it appertains to make and use the same.

My improved process of refining pig iron is designed to remove at a single operation the phosphorus, sulphur and silicon therein contained and is preferably carried out in a cupola furnace of the type set forth in my application Serial No. 322,199, filed August 28, 1889.

Heretofore the sulphur, phosphorus and silicon of pig iron have been removed, if at all, only by separate operations, which in addition to increasing the cost of the product have not effected a complete removal of such impurities. In my improved process, pig iron with or without the addition of wrought iron scrap, may be entirely cleared of these impurities by a single inexpensive operation which I will now describe.

Into a cupola furnace is charged the cast iron with or without the wrought iron scrap together with coke, limestone, fluorspar and oxide of iron. The proportion of these ingredients is made such that under the action of the blast, they combine with the silica, phosphorus &c., of the pig iron to form an extra basic slag (containing little iron oxide). The lime should be present in great excess, and hence as the slag contains more lime than slags of other processes, it can be kept fluid only by the action of fluor spar or similar flux. This slag serves as a neutral medium under the influence of which the phosphorus contained in the metal becomes oxidized and turned into phosphate of lime, the sulphur is driven away by the great heat or changed into sulphide of calcium and the silicon is oxidized and converted into silicate of lime.

By the term "neutral medium," I signify a medium wherein the oxidizing materials are mixed with the reducing materials in such proportions and under such conditions that if a really staple equilibrium does not result, still in the rapid succession of alternative oxidizing and reducing actions, the affinity of the lime for the sulphur and phosphorus prevails and the refining action continues; when under the action of the blast the melted pig descends below the level of the lower tuyeres, the reducing action alone prevails, and the pig in contact with the remaining coke becomes highly carbureted and if left in contact with the slag would withdraw the phosphorus therefrom, and hence destroy the effect of the process. To prevent this action, the metal is drawn from the cupola as soon as it falls below the lower tuyeres and before a sufficient time is given for the phosphorus to be transferred from the slag, the slag and metal being separated in the action of withdrawal.

In starting the furnace, it is first filled with fuel preferably coke, to about two thirds of its height and then a charge is added composed of coke, limestone, fluor spar and cast iron. Iron ore is added after the first ten or twelve charges. The hot blast is then turned on and a high heat thereby maintained within the furnace. The proportions of fuel and fluxing material will vary somewhat with the character of the metal under treatment but should in general consist for every ton of pig metal or pig metal and scrap of three and one-half to four hundred-weight of coke as free from ash as possible; two and one-half to nine hundred-weight of lime as free from clay as possible; three-fourths to one and one-half hundred-weight of fluor spar as free from silicon as possible; none to three hundred-weight of iron ore in large pieces.

In determining the relative proportions of the ingredients to be used with a given charge of pig metal, the following considerations should be borne in mind. For the purpose of securing a neutral or basic medium in which the refining process is to be carried on, it is essential that lime should be used in large excess. The oxide of iron on its reduction furnishes oxygen in addition to that provided by the air blast, for the oxidation of the phosphorus and silicon in the presence of an excess of lime, thus liberating them from the metal, and enabling them to unite with the lime, as phosphate and silicate of lime; while that portion of the sulphur which remains unvolatilized by the heat is converted into sulphide of calcium; the phosphate, silicate and sulphide thus formed passing into and constituting a part of the slag. The quantity of oxide of iron to be added to the charge will depend chiefly upon the air blast, as its chief purpose is to supply any deficiency of oxygen. Care must be taken, however, in adjusting the proportion of oxide of iron in the charge, as if it is too large, it will obstruct the elimination of sulphur and the carburation of iron, while its absence would hinder the elimination of phosphorus by permitting phosphoric acid to escape from the phosphate of lime and return to the iron.

The reduction of the oxide of iron is effected by the carbon of the fuel (or by the carbon furnished by the pig metal) in the presence of an excess of lime.

The fluoride of calcium (fluor spar) is designed to act as a flux, facilitating the introduction of the lime into the slag, and the fusion of its other ingredients, and also to aid the lime in the reduction of the oxide of iron, while being decomposed only to a very small extent, it enters almost entirely into the slag.

I prefer not to use oxide of manganese as an ingredient of the charge, as it has the effect of hindering the dephosphorization of the metal under treatment, by reducing the proportion of oxide of iron in the slag. It might in some measure take the place of the fluor spar, and would make the slag more fusible, but on the whole, I find it rather objectionable.

Until a sufficient amount of refined metal has collected on the hearth of the cupola, the iron and cinder tap hole should be kept closed as usual with a plug of clay. When the melted iron has gathered on the inside hearth of the furnace, to a depth of about four inches, the tap-hole is opened by a bent iron bar thrust through the clay stopper, and the fluid metal is run off through a trough into the fore-hearth of the furnace. During this time, the slag, being at a higher level than the iron, is retained within the furnace. The air-blast is then slackened, and the dam at the mouth of the tap-hole is quickly built up; the blast is then restored to its normal rate, and the slag passes through the tap-hole, over the dam into a receptacle separate from the fore-hearth, into which the iron was run as before described. By this arrangement, the refined metal is drawn off at a point as nearly as possible on a level with the lower row of tuyeres, while the slag is drawn off, immediately after the iron is tapped, at a somewhat higher level. The special object of this is to withdraw the molten metal from the slag, as soon as it ceases to be acted on by the blast as otherwise a partial reduction of the phosphate of lime in the slag would take place and occasion a return of phosphorus to the iron.

In order the better to accomplish the purpose of my invention, the hot-blast tuyeres are arranged in rows at different levels and at a greater vertical distance from each other than is usual, for the reason that as the proportion of lime and fluor spar per ton of cast iron is greater by my process than is usual, it is desirable to increase the depth of the zone of heat so as more readily to fuse and bring into contact all the constituents of the charge so as to facilitate the necessary reactions. It is also desirable to prolong the action of the blast on the iron, slag and fuel until the iron and slag are discharged from the furnace, to effect which the tuyeres in the lowest row have a downward inclination. This arrangement also prevents too high a carburization of the iron, which might result from the extra basic character of the slag, and the high temperature employed in my process. When the slag is being withdrawn from the furnace, a finishing blast of hot air is applied to the slag through the tuyeres.

With the ingredients stated and used in the proportions above specified, the slag produced should have a white, yellowish or greenish appearance, and should approximate as nearly as possible to the following composition:—silicon and phosphoric acid nine to fourteen per cent.; alumina from coke and fluxes (as little as possible) say two to three per cent.; lime, magnesia or similar basic material forty-five to sixty per cent.; fluoride of calcium twenty-five to thirty-five per cent.; oxide of iron one and one-half to three per cent.; sulphur left after volatilization and oxidation one to two per cent.

The process described may be carried on continuously for a considerable time, fresh charges of pig metal, fuel and fluxes being added at the top of the furnace as its contents become fused and pass off as refined iron and slag.

One of the peculiarities of my process resulting partly from the character and proportions of the fuel and fluxes employed is that the inside lining of the furnace which is a thin coating of refractory material, becomes, after use for twenty or thirty hours, covered in those parts which are exposed to rapid wear, with a lining of metallic iron, which covers and protects the refractory lining and prevents the necessity of its renewal. This also obviates the necessity of having the furnace lined with basic material, which would rapidly become reduced, and need frequent renewal or repair.

Iron purified by my improved process will run from white iron to iron having a crystalline texture, and will vary in the proportion of carbon from 3.2 to four per cent.

In describing my improved process, I have spoken of the necessity of using a high degree of heat for insuring the elimination of the sulphur, the fluidity of the slag and a sufficient carburization of the metal, and I have specified the use of coke as the fuel, and of a hot-air blast for intensifying the heat. I desire, however, to state that I do not wish to confine myself to the use of any particular kind of fuel, nor specially to the use of hot blast, nor to the special construction of furnace described, as these may be varied. Other fuels for obtaining the necessary degree of heat, and other means for bringing the melted iron in contact with a neutral refining medium and highly basic slag, and of separating the iron from the slag when there is danger of reversion of the eliminated impurities to the iron, may be adopted, and I therefore intend that the terms "carbonaceous fuel" and "hot blast," as used in this specification and the following claims, shall be understood as covering equivalent means of applying the necessary heat. I consider myself the first to use lime, fluor spar and iron oxide in calculated proportions in refining iron and therefore wish to claim the same broadly.

Having thus described my improved process of refining iron, what I claim as my invention and desire to secure by Letters Patent is

1. The process of refining pig iron consisting in subjecting the same mixed with fuel, limestone, fluorspar and iron oxide, to the action of a blast and separating the refined iron from the slag, substantially as set forth.

2. The process of refining pig iron, consisting in mixing it with fuel, limestone, fluorspar and iron oxide, and heating the same to about 800° Fahrenheit, thereby forming an extra basic slag containing little iron oxide, and separating the refined iron from the slag; substantially as described.

3. The process of refining pig iron, consisting in mixing the same with fuel, limestone, fluorspar and iron oxide, and subjecting the mixture to the action of a hot blast, thereby forming an extra basic slag containing little iron oxide, and separating the refined iron from the slag as soon as the mixture descends below the action of the blast; substantially as described.

In testimony whereof I affix my signature in presence of two witnesses.

ANTOINE PIERRE GUILLAUME ROLLET.

Witnesses:
G. DE MESTRAL,
R. J. PRESTON.